United States Patent
Xu et al.

(10) Patent No.: US 11,122,520 B2
(45) Date of Patent: Sep. 14, 2021

(54) COVERAGE ENHANCEMENTS FOR PHYSICAL BROADCAST CHANNEL (PBCH)

(71) Applicant: QUALCOMM Incorporated, San Diego, CA (US)

(72) Inventors: Hao Xu, San Diego, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 892 days.

(21) Appl. No.: 14/489,146

(22) Filed: Sep. 17, 2014

(65) Prior Publication Data
US 2015/0078300 A1   Mar. 19, 2015

Related U.S. Application Data

(60) Provisional application No. 61/879,634, filed on Sep. 18, 2013.

(51) Int. Cl.
*H04W 52/24* (2009.01)
*H04W 74/08* (2009.01)
(Continued)

(52) U.S. Cl.
CPC ......... *H04W 52/241* (2013.01); *H04L 5/0053* (2013.01); *H04W 24/08* (2013.01);
(Continued)

(58) Field of Classification Search
None
See application file for complete search history.

(56) References Cited

U.S. PATENT DOCUMENTS

2012/0147830 A1* 6/2012 Lohr ............... H04L 1/1864
  370/329
2012/0320842 A1* 12/2012 Jeong ............... H04W 74/006
  370/329

(Continued)

FOREIGN PATENT DOCUMENTS

CN         1866777 A    11/2006
CN       103168489 A     6/2013
(Continued)

OTHER PUBLICATIONS

European Search Report—EP16197829—Search Authority—The Hauge—dated Feb. 16, 2017.
(Continued)

*Primary Examiner* — Robert M Morlan
(74) *Attorney, Agent, or Firm* — Patterson & Sheridan, L.L.P. / Qualcomm

(57) ABSTRACT

Certain aspects of the present disclosure generally relate to wireless communications, and more specifically, coverage enhancements for physical broadcast channel (PBCH). According to certain aspects, a method is provided for wireless communications by a user equipment (UE). The method generally includes receiving a physical downlink shared channel (PDSCH) transmission, receiving a different type downlink transmission, with transmit power boosted relative to the PDSCH transmission, receiving information regarding relative transmit power of the PDSCH transmission relative to a common reference signal (CRS) based on the transmit power of the different type downlink transmission, and processing the PDSCH transmission based on the information.

22 Claims, 11 Drawing Sheets

900

902

RECEIVE A BUNDLED RANDOM ACCESS CHANNEL (RACH) TRANSMISSION FROM A USER EQUIPMENT (UE)

904

TRIGGER BUNDLED TRANSMISSION OF BROADCAST INFORMATION, IN RESPONSE TO RECEIVING THE BUNDLED RACH TRANSMISSION

(51) Int. Cl.
| | |
|---|---|
| *H04W 24/08* | (2009.01) |
| *H04L 5/00* | (2006.01) |
| *H04W 52/16* | (2009.01) |
| *H04W 52/32* | (2009.01) |
| *H04W 52/14* | (2009.01) |
| *H04W 74/00* | (2009.01) |

(52) U.S. Cl.
CPC ......... *H04W 52/16* (2013.01); *H04W 52/322* (2013.01); *H04W 74/08* (2013.01); *H04W 74/0833* (2013.01); *H04L 5/0023* (2013.01); *H04L 5/0039* (2013.01); *H04W 52/143* (2013.01); *H04W 74/006* (2013.01)

(56) References Cited

U.S. PATENT DOCUMENTS

| | | |
|---|---|---|
| 2013/0003663 A1 | 1/2013 | Blankenship et al. |
| 2013/0040578 A1 | 2/2013 | Khoshnevis et al. |

FOREIGN PATENT DOCUMENTS

| | | |
|---|---|---|
| JP | 2013157815 A | 8/2013 |
| WO | WO-2009023835 A1 | 2/2009 |
| WO | WO-2011014728 A2 | 2/2011 |
| WO | WO-2012149559 A1 | 11/2012 |

OTHER PUBLICATIONS

"3rd Generation Partnership Project; Technical Specification Group Radio Access Network; Evolved Universal Terrestrial Radio Access (E-UTRA); Physical layer procedures (Release 11)", 3GPP Standard; 3GPP TS 36.213, 3rd Generation Partnership Project (3GPP), Mobile Competence Centre; 650, Route Des Lucioles; F-06921 Sophia-Antipolis Cedex; France, vol. RAN WG1, No. V11.3.0, Jun. 25, 2013 (Jun. 25, 2013). pp. 1-176, XP050692859, [retrieved on Jun. 25, 2013].

"3rd Generation Partnership Project; Technical Specification Group Radio Access Network; Study on provision of low-cost Machine-Type Communications (MTC) User Equipments (UEs) based on LTE (Release 12)", 3GPP Standard; 3GPP TR 36.888, 3rd Generation Partnership Project (3GPP), Mobile Competence Centre; 650, Route Des Lucioles; F-06921 Sophia-Antipolis Cedex; France, vol. RAN WG1, No. V12.0.0, Jun. 25, 2013 (Jun. 25, 2013), pp. 1-55, XP050692861, [retrieved on Jun. 25, 2013].

Hitachi Ltd., "Further Consideration on the Signaling Support for Reduced Power ABS", 3GPP Draft; R1-122698_Further_Considerationon_The_Signaling_Support_for_Reduced_Power_ABS, 3rd Generation Partnership Project (3GPP), Mobile Competence Centre; 650, Route Des Lucioles; F-06921 Sophia-Antipolis Cedex; France, vol. RAN WG1, No. Prague, Czech Republic; May 21, 2012-May 25, 2012, May 12, 2012 (May 12, 2012), XP050600883, [retrieved on May 12, 2012], the whole document.

Huawei et al., "Further discussion on PBCH coverage improvement for low cost MTC", 3GPP Draft; R1-132880, 3rd Generation Partnership Project (3GPP), Mobile Competence Centre ; 650, Route Des Lucioles ; F-06921 Sophia-Antipolis Cedex ; France , vol. RAN WG1, No. Barcelona, Spain; Aug. 19, 2013-Aug. 23, 2013 Aug. 10, 2013 (Aug. 10, 2013), XP050716124, 4 Pages, Retrieved from the Internet: URL:http://www.3gpp.org/ftp/tsg_ran/WG1_RL 1/TSGR1_74/Docs/ [retrieved on Aug. 10, 2013].

Intel Corporation: "Discussion on PBCH Coverage Enhancement for Low Cost MTC", 3GPP Draft; R1-133157—Discussion on PBCH Coverage Enhancement for Low Cost MTC, 3rd Generation Partnership Project (3GPP), Mobile Competence Centre ; 650, Route Des Lucioles ; F-06921 Sophia-Antipol, vol. RAN WG1, No. Barcelona, Spain; Aug. 19, 2013-Aug. 23, 2013 Aug. 10, 2013 (Aug. 10, 2013), XP050716367, pp. 1-6, Retrieved from the Internet: URL:http://www.3gpp.org/ftp/tsg_ran/WG1_RL 1/TSGR1_74/Docs/ [retrieved on Aug. 10, 2013].

International Search Report and Written Opinion—PCT/US2014/056300—ISA/EPO—Mar. 10, 2015.

LG Electronics: "Initial procedure and consideration points for the coverage enhancement of MTC UEs", 3GPP Draft; R1-133370 MTC Coverage (Final), 3rd Generation Partnership Project (3GPP), Mobile Competence Centre; 650, Route Des Lucioles ; F-06921 Sophia-Antipolis Cedex ; France, vol. RAN WG1, No. Barcelona, Spain; Aug. 19, 2013-Aug. 23, 2013 Aug. 10, 2013 (Aug. 10, 2013), XP050716484, 6 Pages, Retrieved from the Internet: URL:http://www.3gpp.org/ftp/tsg_ran/WG1_RL 1/TSGR1_74/Docs/ [retrieved on Aug. 10, 2013].

Partial International Search Report—PCT/US2014/056300—ISA/EPO—Dec. 11, 2014.

Qualcomm Incorporated: "Coverage enhancement techniques for MTC," 3GPP Draft; R1-130589 Coverage Enhancement Techniques for MTC, 3rd Generation Partnership Project (3GPP), Mobile Competence Centre; 650, Route Des Lucioles; F-06921 Sophia-Antipolis Cedex; France, vol. RAN WG1, No. St Julian; Jan. 28, 2013-Jan. 1, 2013, Jan. 19, 2013 (Jan. 19, 2013), 7 pages, XP050663845, Retrieved from the Internet < URL:http://www.3gpp.org/ftp/tsg_ran/WG1_RL1/TSGR1_72/Docs/ >, [retrieved on Jan. 19, 2013] the whole document.

Samsung: "Further discussion on downlink power allocation for CoMP", 3GPP Draft; R1-123478-COMP-DL_PC, 3rd Generation Partnership Project (3GPP), Mobile Competence Centre; 650, Route Des Lucioles; F-06921 Sophia-Antipolis Cedex; France, vol. RAN WG1, No. Qingdao; Aug. 13, 2012-Aug. 17, 2012, Aug. 5, 2012 (Aug. 5, 2012), XP050661357, Retrieved from the Internet: URL:http://www.3gpp.org/ftp/tsg_ran/WG1_RL1/TSGR1_70/Docs/ [retrieved on Aug. 5, 2012].

Sony., "PBCH coverage extension for low-cost MTC UEs by power-density boosting", 3GPP Draft; R1-130958, 3rd Generation Partnership Project (3GPP), Mobile Competence Centre; 650, Route Des Lucioles; F-06921 Sophia-Antipolis Cedex; France Apr. 5, 2013 (Apr. 5, 2013), XP050696704, Retrieved from the Internet: URL:http://www.3gpp.org/ftp/tsg_ran/WG1_RL1/TSGR1_72b/Docs/ [retrieved on Apr. 5, 2013], the whole document.

Alcatel-Lucent Shanghai Bell: "Configurable Repetition Level for PBCH", 3GPP TSG-RAN WG1#73 R1-132055, May 24, 2013, 4 Pages, URL:http://www.3gpp.org/ftp/tsg_ran/WG1_RL1/TSGR1_73/Docs/R1-132055.zip.

European Search Report—EP16197822—Search Authority—Munich—dated Feb. 16, 2017.

European Search Report—EP16197824—Search Authority—Munich—dated Feb. 16, 2017.

Sony: "PDCCH coverage extension for low-cost MTC UEs by power-density Boosting", 3GPP Draft; 3GPP TSG RAN WG1 #72bis,R1-130960, 3rd Generation Partnership Project (3GPP), Mobile Competence Centre; 650, Route Des Lucioles; F-06921 Sophia-Antipolis Cedex; France vol. Ran Wg1, No. Chicago, USA; Apr. 15, 2013-Apr. 19, 2013 Apr. 5, 2013 (Apr. 5, 2013) XP050696706, pp. 1-7. URL:http://www.3gpp.org/ftp/tsg_ran/WG1_RL1/TSGR1_72b/Docs.

* cited by examiner

COVERAGE ENHANCEMENTS FOR PHYSICAL BROADCAST CHANNEL (PBCH)

CROSS-REFERENCE TO RELATED APPLICATION(S)

This application claims benefit of U.S. Provisional Patent Application Ser. No. 61/879,634, filed Sep. 18, 2013, which is herein incorporated by reference in its entirety.

BACKGROUND

I. Field of the Invention

Certain aspects of the present disclosure generally relate to wireless communications, and more specifically, to coverage enhancements for physical broadcast channel (PBCH).

II. Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques and apparatus are provided herein for coverage enhancements for physical broadcast channel (PBCH).

Certain aspects of the present disclosure provide a method for wireless communications by a base station (BS). The method generally includes obtaining a first set of one or more power allocation parameters for use in transmitting a physical downlink share channel (PDSCH) and transmitting a different type downlink transmission, with transmit power boosted relative to a PDSCH transmission sent using the first set of power allocation parameters, based on a second set of one or more power allocation parameters. Certain aspects of the present disclosure provide an apparatus for wireless communications by a base station (BS). The apparatus generally includes at least one controller or processor configured to: obtain a first set of one or more power allocation parameters for use in transmitting a physical downlink share channel (PDSCH) and transmit a different type downlink transmission, with transmit power boosted relative to a PDSCH transmission sent using the first set of power allocation parameters, based on a second set of one or more power allocation parameters Certain aspects of the present disclosure provide a method for wireless communications by a user equipment (UE). The method generally includes receiving a PDSCH transmission, receiving a different type downlink transmission, with transmit power boosted relative to the PDSCH transmission, receiving information regarding relative transmit power of the PDSCH transmission relative to a common reference signal (CRS) based on the transmit power of the different type downlink transmission, and processing the PDSCH transmission based on the information. Certain aspects of the present disclosure provide an apparatus for wireless communications by a user equipment (UE). The apparatus generally includes at least one controller or processor configured to: receive a PDSCH transmission, receive a different type downlink transmission, with transmit power boosted relative to the PDSCH transmission, receive information regarding relative transmit power of the PDSCH transmission relative to a common reference signal (CRS) based on the transmit power of the different type downlink transmission, and process the PDSCH transmission based on the information.

Certain aspects of the present disclosure provide a method for wireless communications by a BS. The method generally includes transmitting a PBCH in at least one subframe of a radio frame and repeating transmission of the PBCH in at least one of: the same subframe or in a different subframe of the radio frame. Certain aspects of the present disclosure provide an apparatus for wireless communications by a BS. The apparatus generally includes at least one controller or processor configured to: transmit a PBCH in at least one subframe of a radio frame and repeat transmission of the PBCH in at least one of: the same subframe or in a different subframe of the radio frame.

Certain aspects of the present disclosure provide a method for wireless communications by a UE. The method generally includes receiving rate matching information for a repeated PBCH transmission in a radio frame and processing downlink transmissions in the radio frame, based on the rate matching information. Certain aspects of the present disclosure provide an apparatus for wireless communications by a UE. The apparatus generally includes at least one controller or processor configured to: receive rate matching information for a repeated PBCH transmission in a radio frame and process downlink transmissions in the radio frame, based on the rate matching information.

Certain aspects of the present disclosure provide a method for wireless communications by a BS. The method generally includes receiving a bundled random access channel (RACH) transmission from a UE and triggering bundled transmission of broadcast information, in response to receiving the bundled RACH transmission. Certain aspects of the present disclosure provide an apparatus for wireless communications by a BS. The apparatus generally includes at least one controller or processor configured to: receive a bundled random access channel (RACH) transmission from a UE and trigger bundled transmission of broadcast information, in response to receiving the bundled RACH transmission.

Certain aspects of the present disclosure provide a method for wireless communications by a UE. The method generally includes receiving a bundled transmission of a system information block (SIB) that indicates a bundled physical RACH (PRACH) configuration and performing a bundled RACH transmission in accordance with the PRACH configuration in order to trigger bundled transmission of broadcast information. Certain aspects of the present disclosure provide an apparatus for wireless communications by a UE. The apparatus generally includes at least one controller or processor configured to: receive a bundled transmission of a system information block (SIB) that indicates a bundled physical RACH (PRACH) configuration and perform a bundled RACH transmission in accordance with the PRACH configuration in order to trigger bundled transmission of broadcast information.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Aspects of the present disclosure provide techniques and apparatus for enhancing downlink coverage for certain user equipments (e.g., low cost, low data rate UEs).

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

An Example Wireless Communications System

Figure 1:
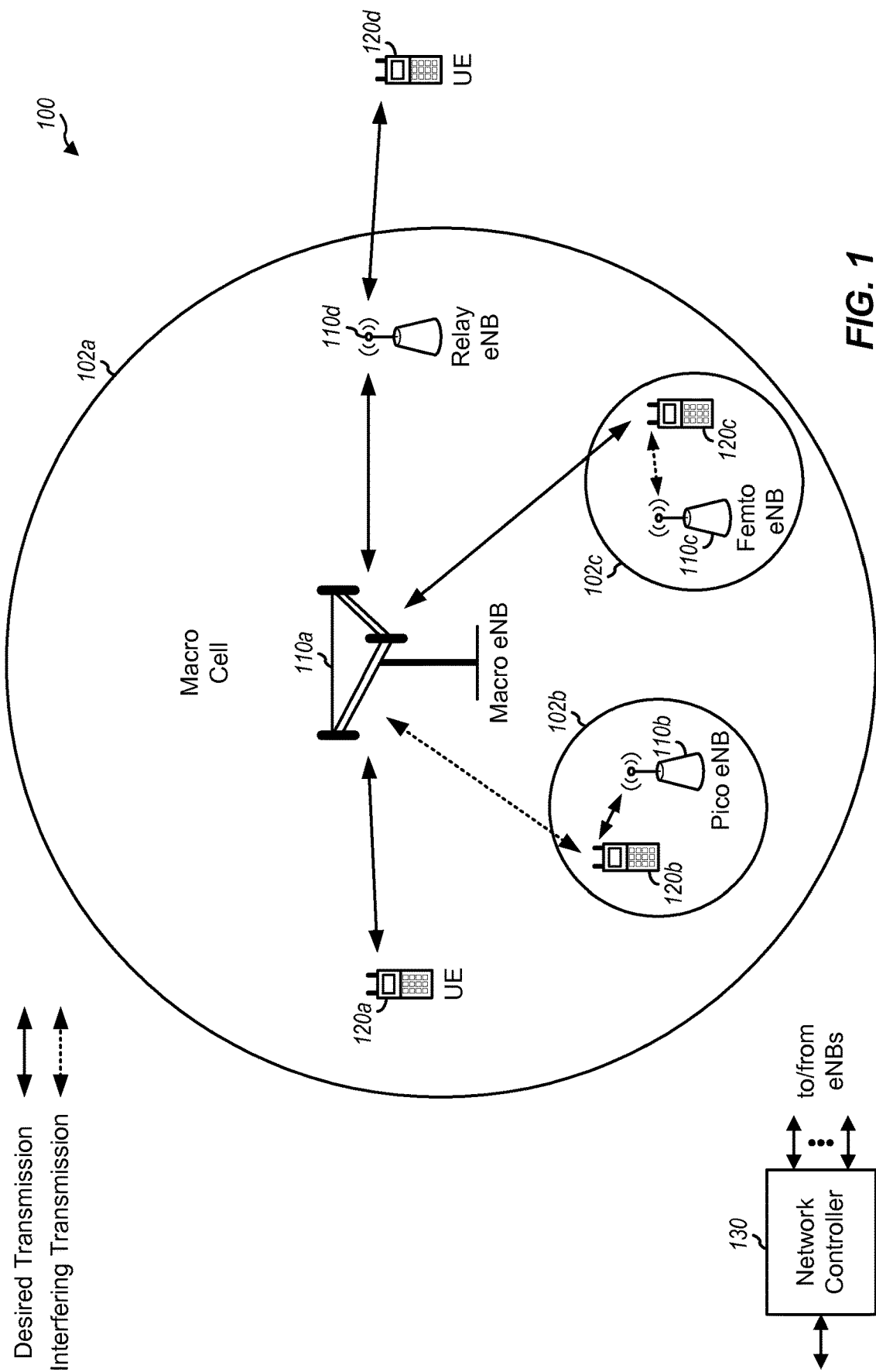
FIG. 1 is a block diagram conceptually illustrating an example wireless communication network, in accordance with certain aspects of the present disclosure.

FIG. 1 shows a wireless communication network 100, which may be an LTE network or some other wireless network in which the techniques and apparatus of the present disclosure may be applied. Wireless network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB or an eNB subsystem serving this coverage area, depending on the context in which the term is used.

An eNB may provide communication coverage for a macro cell, a pico cell, a femto cell, or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc.

Figure 2:
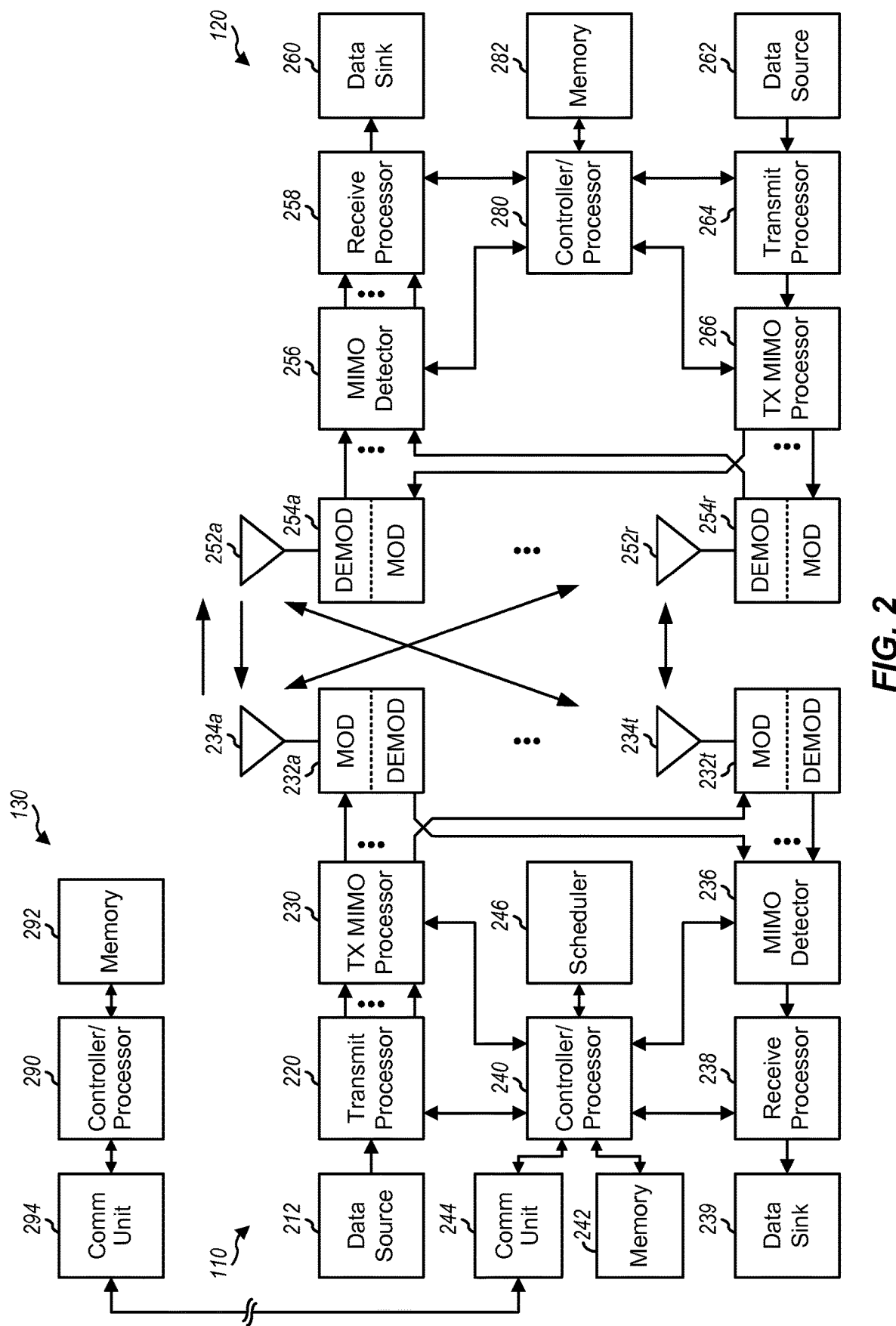
FIG. 2 is a block diagram conceptually illustrating an example of an evolved node B (eNB) in communication with a user equipment (UE) in a wireless communications network, in accordance with certain aspects of the present disclosure.

FIG. 2 is a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Controller/processor 240 or other controllers/processors and modules at base station 110, or controller/processor 280 or other controllers/processors and modules at UE 120, may perform or direct processes for the techniques described herein. Memories 242 and 282 may store data and program codes for base station 110 and UE 120, respectively. A scheduler 246 may schedule UEs for data transmission on the downlink or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals (RSs) such as UE-RS or data in the resource blocks may be precoded using the same precoder. The power level used for the UE-RS in each resource block (RB) of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous RBs, wherein at least one reference signal in resource blocks in each bundle are precoded with a common precoding matrix, estimate at least one precoded channel based on the determined bundling size and one or more RSs transmitted from the base station, and decode the received bundles using the estimated precoded channel.

Figure 3:
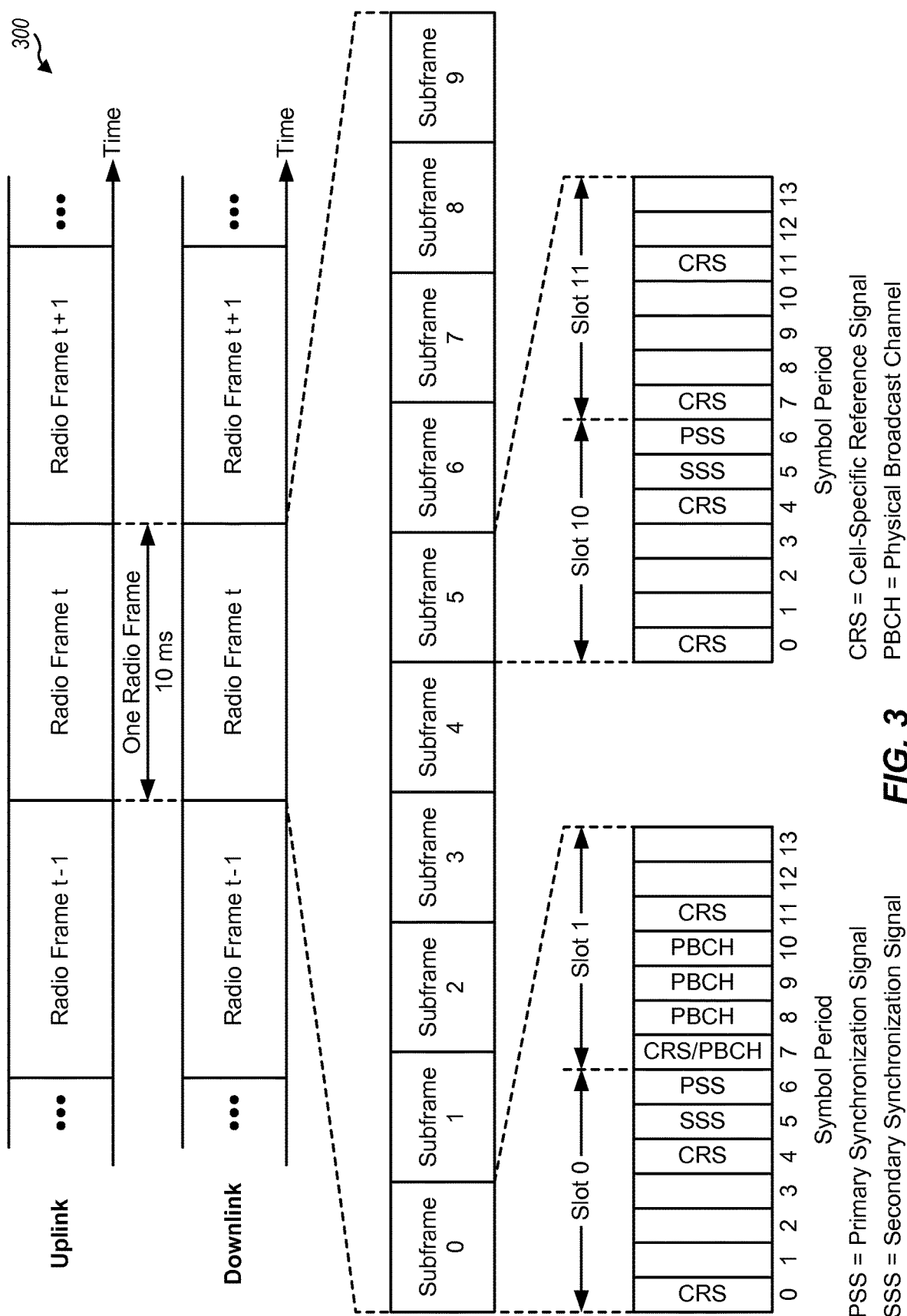
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L-1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
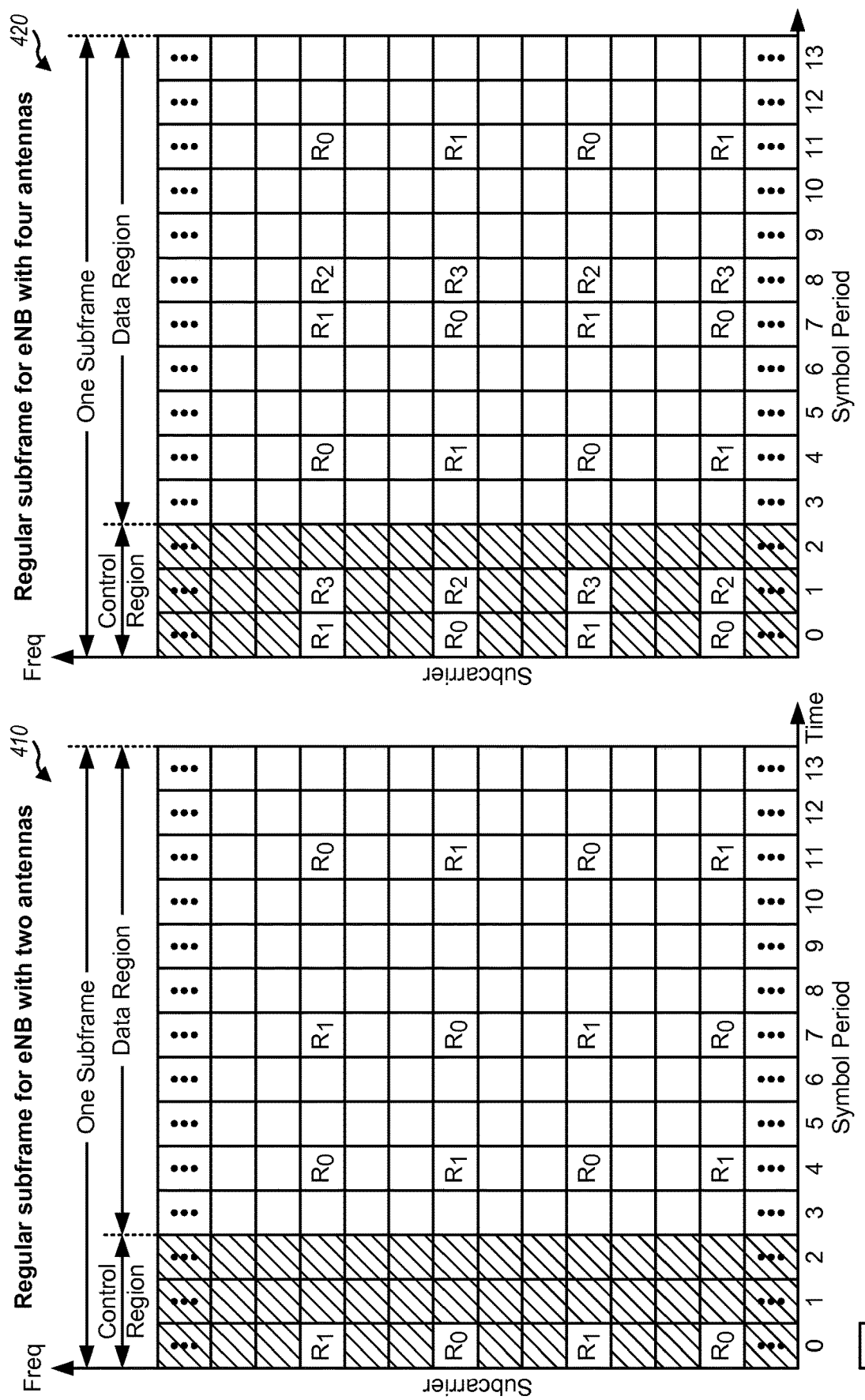
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, or other data).

An interlace structure may be used for each of the downlink and uplink for FDD in LTE. For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

Example PBCH Design with Coverage Enhancements

In certain systems (e.g., Long Term Evolution (LTE) Release 8 or more recent), transmission time interval (TTI) bundling (e.g., subframe bundling) can be configured on a per-user equipment (UE) basis. TTI bundling may be configured by the parameter, ttiBundling, provided from higher layers. If TTI bundling is configured for a UE, the subframe bundling operation may only be applied to the uplink shared channel (UL-SCH), for example, physical uplink shared channel (PUSCH), and may not be applied to other uplink signals or traffic (e.g., such as uplink control information (UCI)). In some cases, TTI bundling size is fixed at four subframes (e.g., the PUSCH is transmitted in four consecutive subframes). The same hybrid automatic repeat request (HARQ) process number can be used in each of the bundled subframes. The resource allocation size may be restricted to up to three resource blocks (RBs) and the modulation order can be set to two (e.g., quadrature phase shift keying (QPSK)). A TTI bundle can be treated as a single resource for which a single grant and a single HARQ acknowledgement (ACK) is used for each bundle.

For certain systems (e.g., LTE Release 12), coverage enhancements (e.g., for physical broadcast channel (PBCH)) may be desirable in a variety of scenarios. For example, coverage enhancements may be desirable for providing service to machine-type communication (MTC) devices or devices in deep coverage holes (e.g., in basements, or valleys). Coverage enhancements may be desirable in deployment of higher frequencies (e.g., high microwave or millimeter wave frequencies) for increased bandwidth communications. Coverage enhancements may further be desired for low data rate users, delay tolerant users, voice over internet protocol (VoIP) and medium data rate users, and so on.

Typically, PBCH is transmitted every 40 ms with one burst every 10 ms. According to certain aspects, for PBCH coverage enhancement, an eNodeB (eNB) may perform repetition or bundling of the PBCH. According to certain aspects, for PBCH coverage enhancement, an eNB may boost transmission power for transmissions to the UE. According to certain aspects, for PBCH coverage enhancement, an eNB may reduce the payload size of PBCH.

Power Boosting for PBCH

As mentioned above, according to certain aspects, PBCH may be power boosted (transmitted with increased power) in order to enhance coverage. Increases in power can be generated in a variety of ways. For example, the eNB may reallocate some null tones and use the power that would have been used to transmit on null tones for increasing PBCH transmission power. In another example, power spectral density (PSD) may be reduced across one or more tones from other frequency locations, and the power reductions from each power reduced tone may be allocated to increase PBCH transmission power.

According to certain aspects, the eNB may signal the power boost to the UE. Two power allocation parameters on the physical downlink shared channel (PDSCH) may be notated as Pa and Pb. A range for Pa may be {−6, −4.77, −3, −1.77, 0, 1, 2, 3} dB and a range for Pb may be {0, 1, 2, 3}. Pa and Pb can be controlled by radio resource control (RRC) signaling (e.g., in information elements) and a UE may calculate PDSCH power based on Pa and Pb.

According to certain aspects, for an eNB that transmits on a wide bandwidth, the eNB may boost the power of a PBCH and reduce the remaining power on the other PDSCH tones in the four PBCH transmission symbols. For example, the eNB may signal the power adjustment on each of the four symbols where PBCH is transmitted for PDSCH transmissions in the other frequency tones. Alternatively, the eNB may transmit some null tones in these four symbols, where PBCH is transmitted, and may also signal the UE to rate match around the null tones.

When PBCH is power boosted, one may introduce new Pa' and Pb' parameters to signal the amount of power that has been reallocated to the PBCH similar to currently defined Pa and Pb for symbols with and without CRS. According to certain aspects, power boosting may also apply to secondary synchronization signal (SSS) and primary synchronization signal (PSS), the eNB may signal power adjustment to the UE using transmit power allocation parameters Pa" and Pb", which may also be similar to Pa and Pb, respectively. In cases where PSS or SSS is power boosted, power scaling parameter Pb" may be introduced to signal that PSS or SSS is power boosted. In some cases, some subsets of Pa', Pa", Pb', Pb" may be the same, and same or different parameters may be reused for null tones. In aspects, where PSS or SSS is power boosted, parameter Pa' may be omitted, as PSS and SSS do not contain a common reference signal (CRS).

PBCH Time-Domain Repetition

As mentioned above, PBCH may be repeated in order to enhance coverage. According to certain aspects, PBCH may be repeated in the time domain (e.g., bundled). For example, PBCH may be transmitted in multiple subframes within a radio frame. For example, where the transmission bandwidth is greater than 1.4 MHz, PBCH may be transmitted in subframe 0 (the typical position for PBCH transmission as shown in FIG. 3) and repeated in subframe 5. Thus, PBCH may achieve twice the coverage. According to certain aspects, system information block 1 (SIB1) may be transmitted outside of the center six resource blocks (RBs). However, if the bandwidth is 1.4 MHz, then PBCH can be repeated in subframe 0 in all radio frames, and subframe 5 only in odd radio frames, as subframe 5 for even radio frames is used for SIB1 transmission.

In another example, PBCH may be transmitted in subframe 0 and repeated in another subframe. For example, PBCH may be repeated in subframe 1 or 9 to be adjacent to the PBCH transmitted in subframe 0. PBCH may be transmitted in subframe 4 or 6 to be adjacent to the PBCH transmitted in subframe 5. Transmitting PBCH in a frame or multiple frames adjacent to subframe 0, subframe 5, or both subframes 0 and 5 may reduce UE wake up time or measurement gaps, as the UE performs PSS/SSS detection in subframes 0 and 5.

According to certain aspects, PBCH may be repeated within the same subframe. For example, since PBCH is transmitted on 4 symbols, two copies of PBCH may be sent if a subframe has at least four surplus symbols According to certain aspects, PBCH may be repeated in different subframes within a radio frame and may also be repeated multiple times within a subframe.

PBCH Frequency-Domain Repetition

According to certain aspects, PBCH may be repeated in the frequency domain to achieve enhanced coverage. Typically PBCH is transmitted in the center 6 RBs of four consecutive OFDM symbols in subframe 0 of each radio frame (e.g., as shown in FIG. 3). Frequency domain repetition can be performed where a system is operating on a wide bandwidth (e.g., more than 6 RBs) allowing PBCH to be repeated at different frequencies. According to certain aspects, PBCH may be transmitted (repeated) at the edge of the band to achieve maximum diversity.

According to certain aspects, before decoding PBCH, the UE may not know the bandwidth. According to certain aspects, PBCH may always be repeated at the same frequency location. For example, the PBCH may always be repeated on a fixed location (e.g., at the edge of 5 MHz regardless of actual transmission bandwidth). According to certain aspects, PBCH may always be repeated at the band edge of the downlink bandwidth and the receiving UE may perform blind decoding of the PBCH to determine the actual bandwidth.

According to certain aspects, PBCH may be repeated in both the time domain and the frequency domain (e.g., 2D repetition).

According to certain aspects, for enhanced coverage for PBCH, whether by power boosting, time-domain repetition, or frequency-domain repetition, may involve transmission of the enhanced PBCH in all radio frames such that the coverage enhancement is always available. Alternatively, PBCH coverage enhancements may be transmitted only in some radio frames where such coverage enhancement is necessary or desired.

Rate Matching

According to certain aspects, the eNB may inform the UE of PBCH coverage enhancements to allow PDSCH rate matching around the enhanced PBCH. For PBCH with enhanced coverage by time-domain repetition of the PBCH, the eNB may inform the UE of the repetition pattern of PBCH within subframes or across subframes. For PBCH with power boosting with null tones, the eNB may inform the UE of the power boost level and the allocation of null tones. According to certain aspects, the remaining tones may be assigned for PDSCH. Rate matching may be performed around the entire RB where the enhanced PBCH is allocated. Alternatively, rate matching may be performed around the enhanced PBCH resource element (RE).

According to certain aspects, the various signaling options may be used for the eNB to signal to the UE that the eNB is operating in PBCH enhanced coverage mode. For example, the eNB may broadcast SIB with the PBCH rate matching information. Alternatively, the eNB may use RRC signaling of the PBCH rate matching information. In yet another alternative, the eNB may reuse quasi-collocation and the PDSCH rate matching signaling mechanism to signal the PBCH rate matching information. According to certain aspects, where PSS or SSS is power boosted, similar rate matching operations and signaling may be used around null tones.

According to certain aspects, the eNB may perform bundled broadcast transmissions opportunistically for PBCH with coverage enhancements. For example, the UE may signal the eNB that PBCH coverage enhancements are desired by transmitting a bundled random access channel (RACH) transmission to the eNB. According to certain aspects, the bundled broadcast transmissions from the eNB may include only a subset of SIBs (e.g., SIB2 and above), all the SIBs, or both the PBCH and SIBs. According to certain aspects, where the bundled broadcast includes a subset of SIBs, PBCH and SIB1 may always be bundled, and the eNB may activate SIB subset bundling on receipt of the bundled RACH from the UE, the UE may obtain the configuration of bundled RACH from SIB1. According to certain aspects, after the eNB sends the UE the bundled broadcast transmission, the eNB may turn off bundling for serving other UEs (e.g., for SIB2 and above).

According to certain aspects, the bundled broadcast transmission includes all SIBs, a simplified bundled SIB may be used to indicate a bundled PRACH configuration. According to certain aspects, after detection of a bundled RACH, the eNB may commence broadcasting bundled SIBs. According to certain aspects, the UE may send a preconfigured RACH with at least a predefined RACH sequence, starting position relative to PSS/SSS, and other parameters as appropriate.

Figure 5:
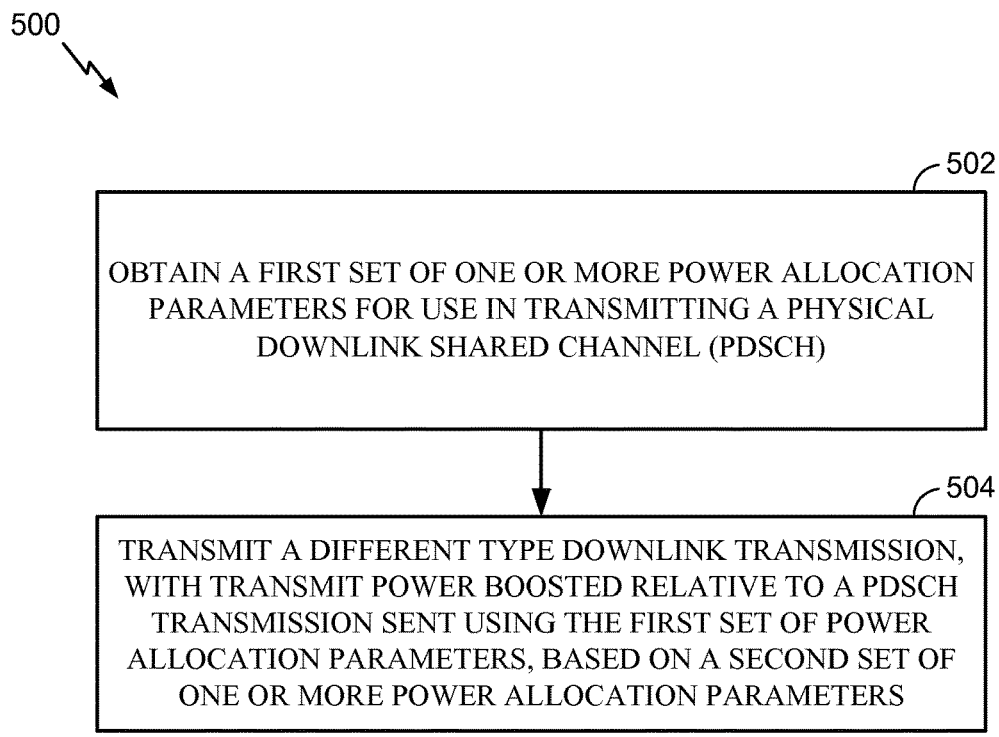
FIG. 5 illustrates example operations for a base station, in accordance with certain aspects of the present disclosure.
Figure 5A:
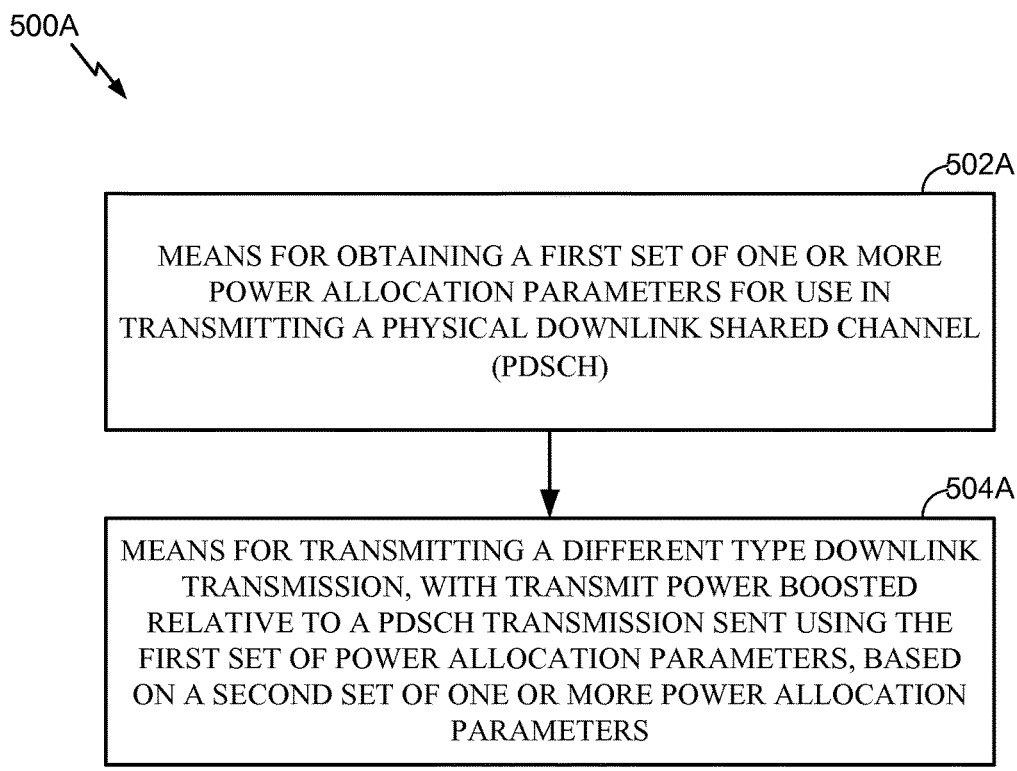
FIG. 5A illustrates example means capable of performing the operations shown in FIG. 5, in accordance with certain aspects of the present disclosure.

FIG. 5 illustrates example operations 500 for wireless communications, in accordance with certain aspects of the present disclosure. The operations may be performed, for example, by a base station (e.g., eNB 110). The operations 500 may begin, at 502, by obtaining a first set of one or more power allocation parameters for use in transmitting a physical downlink shared channel (PDSCH).

At 504, the base station may transmit a different type downlink transmission (e.g., a PBCH, PSS, SSS), with transmit power boosted relative to a PDSCH transmission (e.g., sent using the first set of power allocation parameters), based on a second set of one or more power allocation parameters. According to certain aspects, the BS may transmit PDSCH with power adjusted to compensate for transmitting the different type downlink transmission with boosted transmit power. According to certain aspects, the base station may signal information regarding the second set of power allocation parameters to a UE. For example, the second set of one or more power allocation parameters may include at least one power allocation parameter for PBCH symbols and at least one power allocation parameter for non-PBCH symbols. Transmitting the different type downlink transmission may include boosting power of PBCH symbols while transmitting null tones on some frequency tones.

According to certain aspects, the base station may signal rate matching information for the PBCH transmission with null tones via at least one of a SIB, RRC signaling, new PBCH rate matching information, or reuse of quasi-collocation signaling. Transmitting the PBCH may include boosting power of PBCH symbols while reducing transmission power on remaining PDSCH symbols.

In aspects, the BS may also signal information regarding a power adjustment for the remaining PDSCH symbols.

Figure 6:
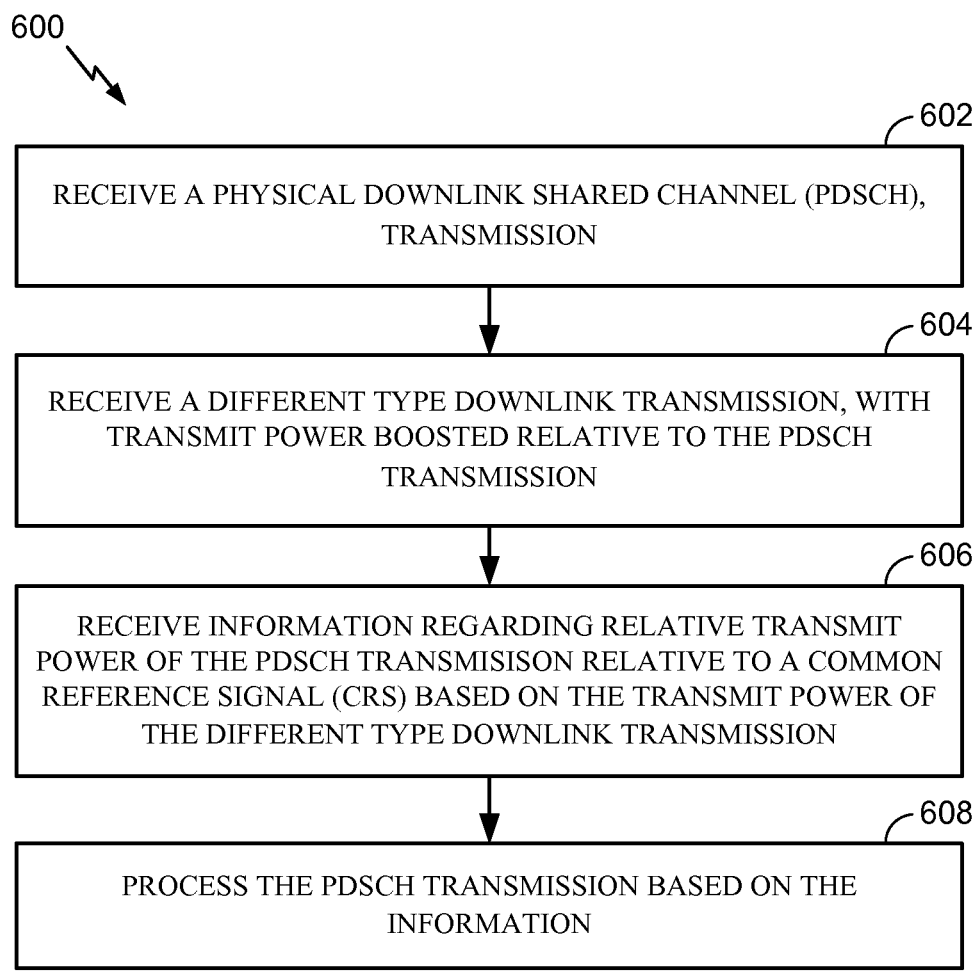
FIG. 6 illustrates example operations for a UE, in accordance with certain aspects of the present disclosure.
Figure 6A:
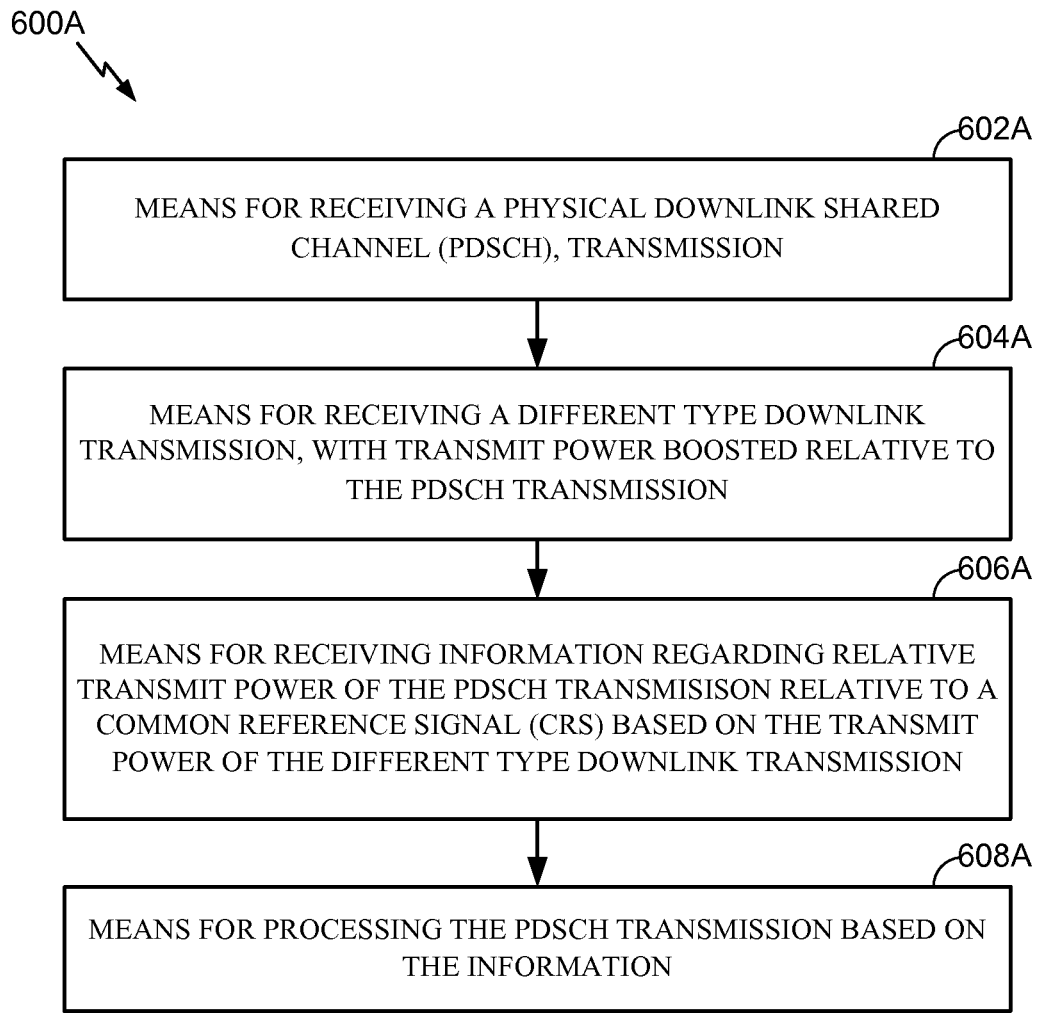
FIG. 6A illustrates example means capable of performing the operations shown in FIG. 6, in accordance with certain aspects of the present disclosure.

FIG. 6 illustrates example operations 600 for wireless communications, in accordance with certain aspects of the present disclosure. The operations 600 may be performed, for example, by a UE (e.g., UE 120). The operations 600 may begin, at 602, by receiving a PDSCH transmission.

At 604, the UE may receive a different type downlink transmission, with transmit power boosted relative to the PDSCH transmission. For example, the UE may receive a PBCH with transmit power boosted based on a second set of one or more power allocation parameters (e.g., at least one power allocation parameter for PBCH symbols and at least one power allocation parameter for non-PBCH symbols). In another example, the UE may receive at least one synchronization signal.

At 606, the UE may receive information regarding relative transmit power of the PDSCH transmission relative to a common reference signal (CRS) based on the transmit power of the different type downlink transmission. For example, the UE may receive signaling regarding a power adjustment for null tones. In another example, the UE may receive signaling regarding a power adjustment for PDSCH symbols not used for PBCH.

According to certain aspects, the UE may also receive rate matching information for the PBCH transmission via at least one of a SIB, RRC signaling, new PBCH rate matching information, or reuse of quasi-collocation signaling.

At 608, the UE may process the PDSCH transmission based on the information received at 606.

Figure 7:
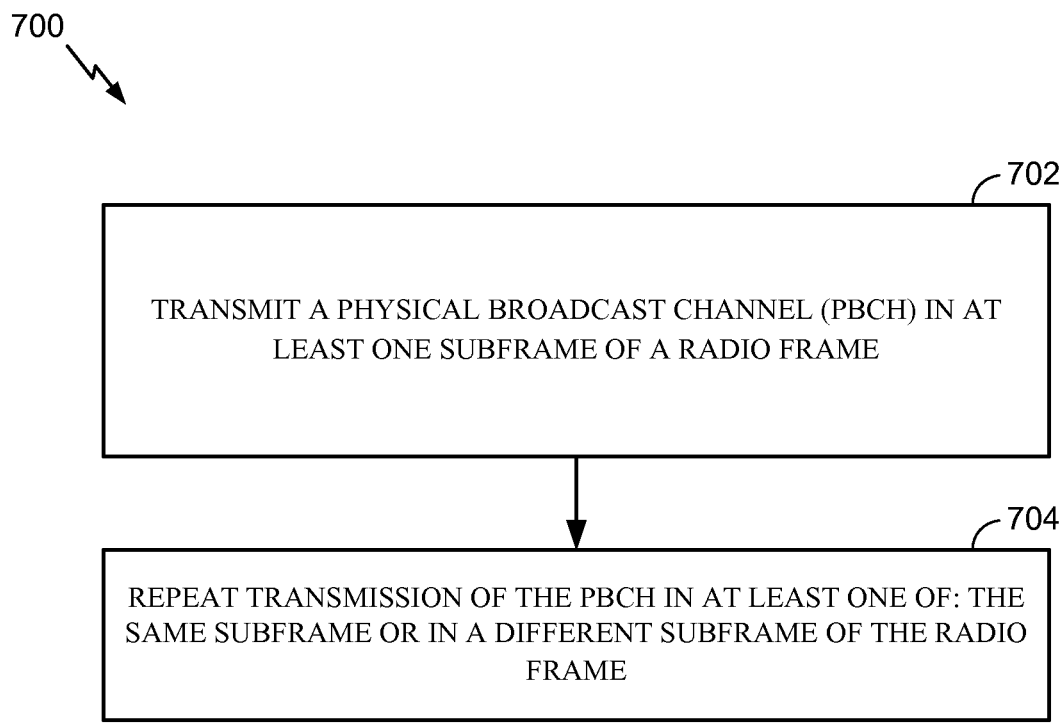
FIG. 7 illustrates example operations for a base station, in accordance with certain aspects of the present disclosure.
Figure 7A:
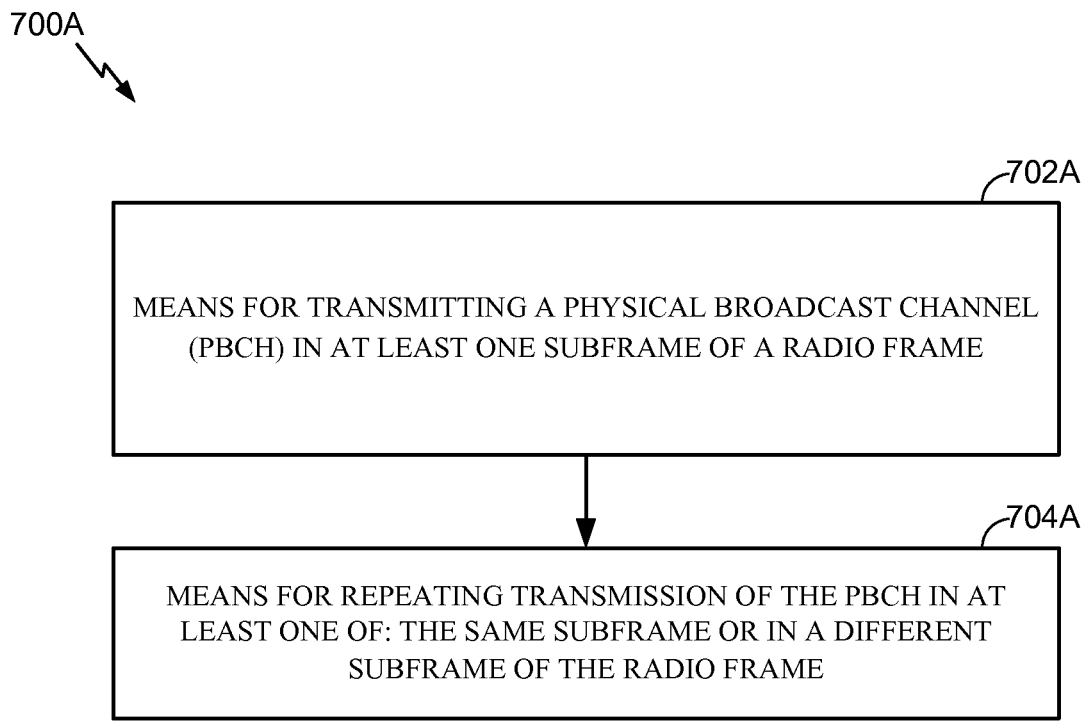
FIG. 7A illustrates example means capable of performing the operations shown in FIG. 7, in accordance with certain aspects of the present disclosure.

FIG. 7 illustrates example operations 700 for wireless communications, in accordance with certain aspects of the present disclosure. The operations may be performed, for example, by a base station (e.g., eNB 110). The operations 700 may begin, at 702, by transmitting a PBCH in at least one subframe of a radio frame.

At 704, the base station repeats transmission of the PBCH in at least one of: the same subframe (e.g., using different symbols or different frequency than the first PBCH) or in a different subframe of the radio frame. According to certain aspects, the PBCH transmission may be repeated only with certain operating bandwidths. According to certain aspects, the PBCH transmission may be repeated with a same version and payload in each transmission. According to certain aspects, the PBCH transmission may be repeated only in certain radio frames. According to certain aspects, the repeated PBCH transmission may be triggered by reception of a bundled RACH transmission from a UE.

According to certain aspects, the eNB may signal rate matching information for the repeated PBCH transmission via at least one of a SIB, RRC signaling, new PBCH rate matching information, or reuse of quasi-collocation signaling.

Figure 8:
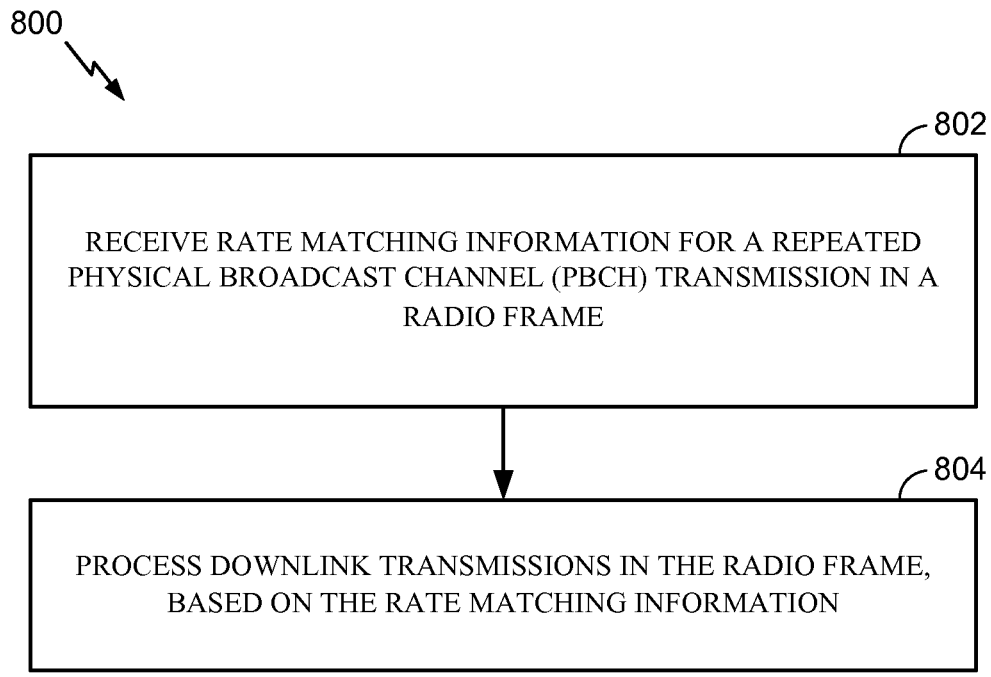
FIG. 8 illustrates example operations for a UE, in accordance with certain aspects of the present disclosure.
Figure 8A:
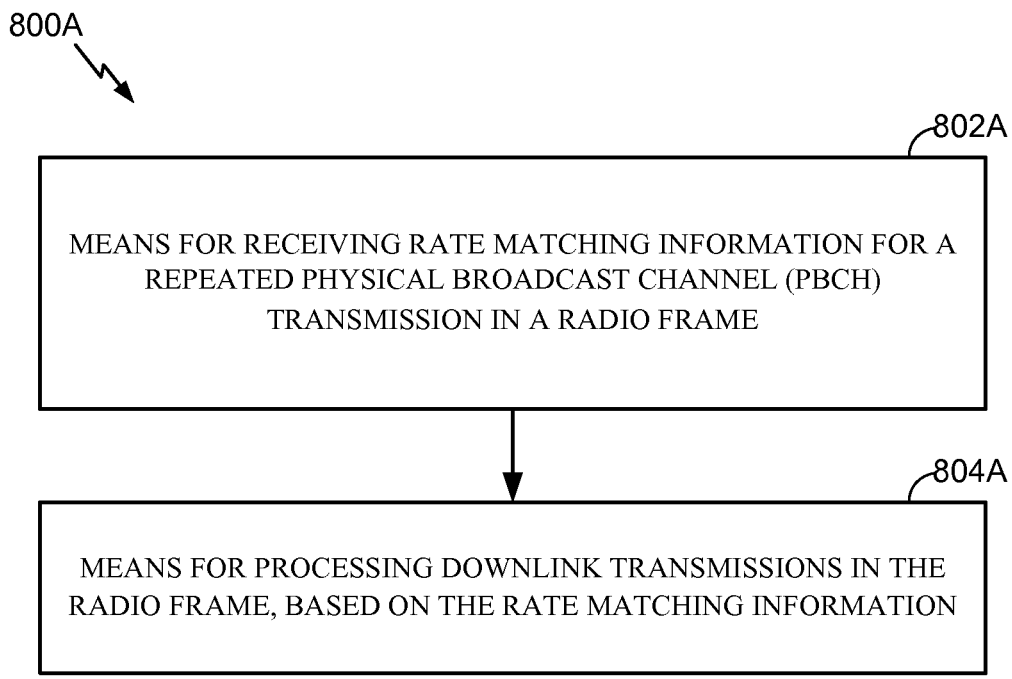
FIG. 8A illustrates example means capable of performing the operations shown in FIG. 8, in accordance with certain aspects of the present disclosure.

FIG. 8 illustrates example operations 800 for wireless communications, in accordance with certain aspects of the present disclosure. The operations 800 may be performed, for example, by a UE (e.g., UE 120). The operations 800 may begin, at 802, by receiving (e.g., via a SIB, RRC signaling, new PBCH rate-matching information, or reuse of quasi-collocation signaling) rate matching information for a repeated PBCH transmission in a radio frame. According to certain aspects, the repeated PBCH transmission may be repeated in at least one of a same subframe or in different subframes of the radio frame.

At 804, the UE may process downlink transmissions in the radio frame, based on the rate matching information.

Figure 9:
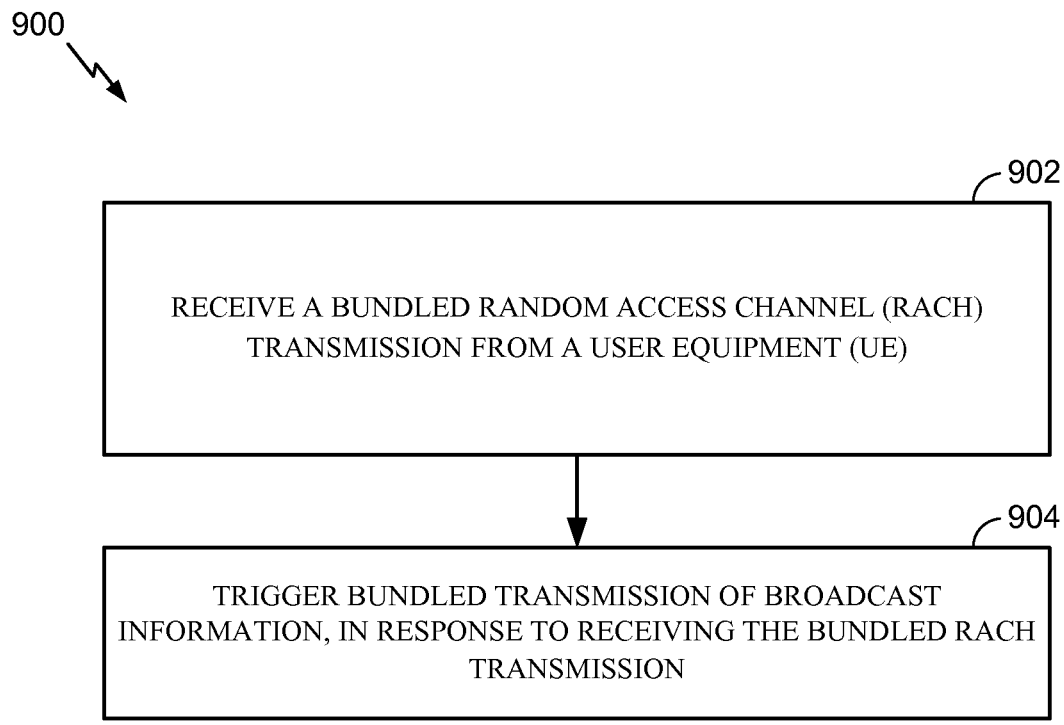
FIG. 9 illustrates example operations for a BS, in accordance with certain aspects of the present disclosure.
Figure 9A:
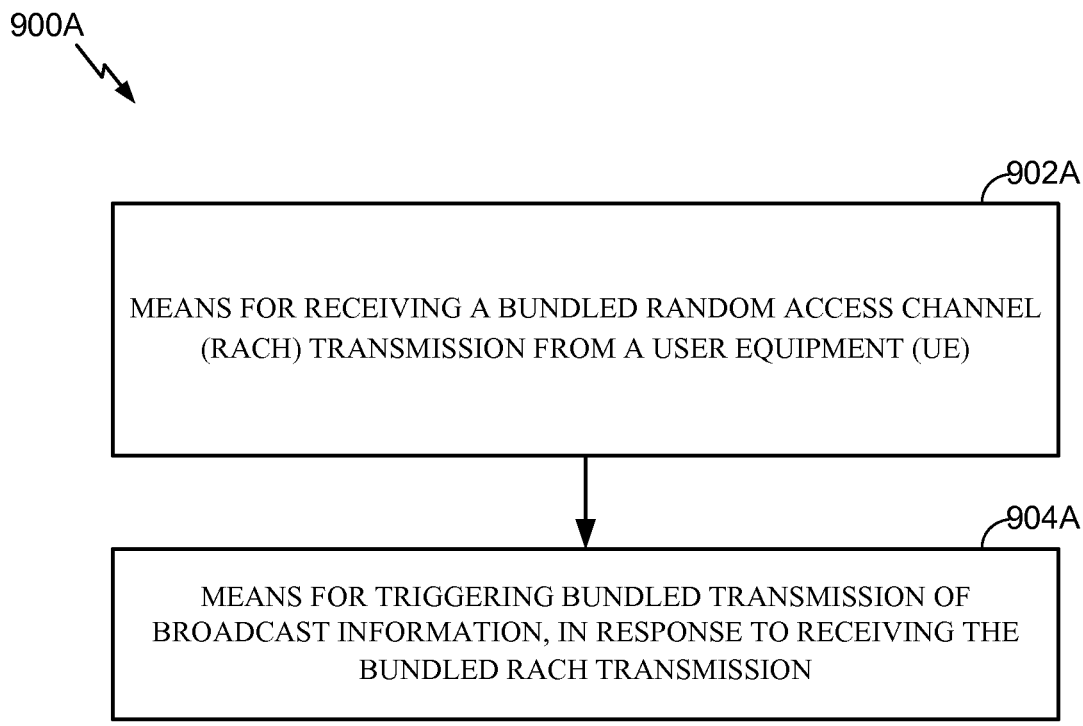
FIG. 9A illustrates example means capable of performing the operations shown in FIG. 9, in accordance with certain aspects of the present disclosure.

FIG. 9 illustrates example operations 900 for wireless communications, in accordance with certain aspects of the present disclosure. The operations may be performed, for example, by a base station (e.g., eNB 110). The operations 900 may begin, at 902, by receiving a bundled RACH transmission from a UE.

At 904, the base station may trigger bundled transmission of broadcast information (e.g., SIB, subset of available SIBs, PBCH, etc., or combinations thereof) in response to receiving the bundled RACH transmission.

According to certain aspects, the base station may transmit a bundled transmission of a SIB that indicates a bundled PRACH configuration prior to detecting the bundled RACH.

Figure 10:
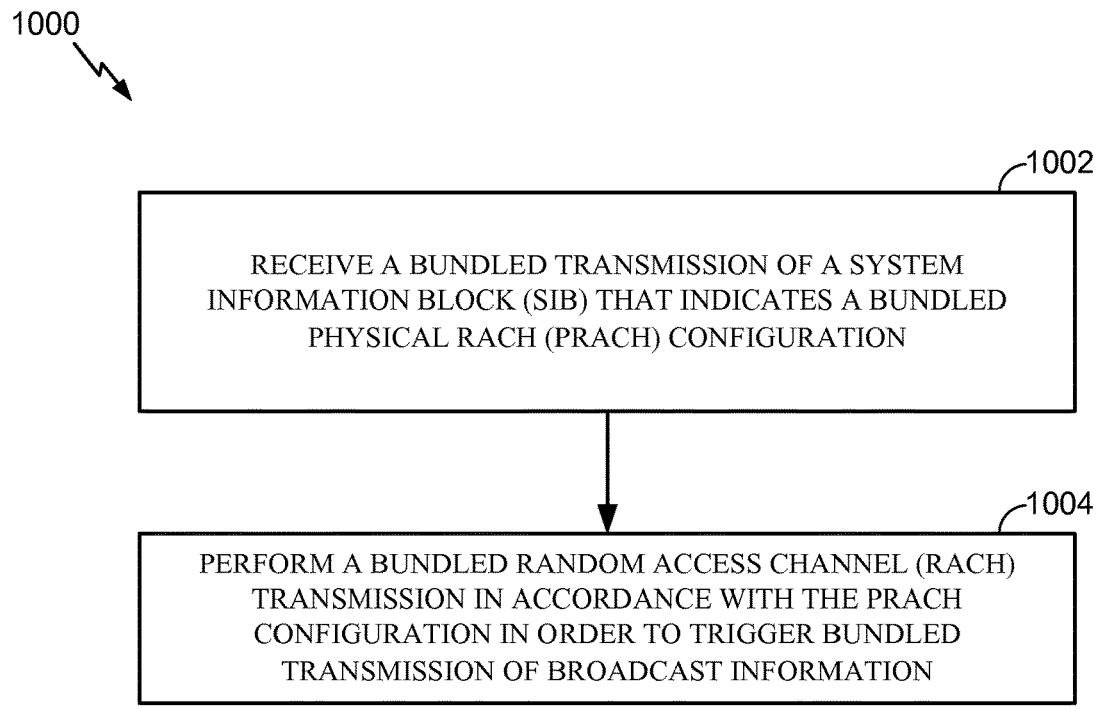
FIG. 10 illustrates example operations for a UE, in accordance with certain aspects of the present disclosure.
Figure 10A:
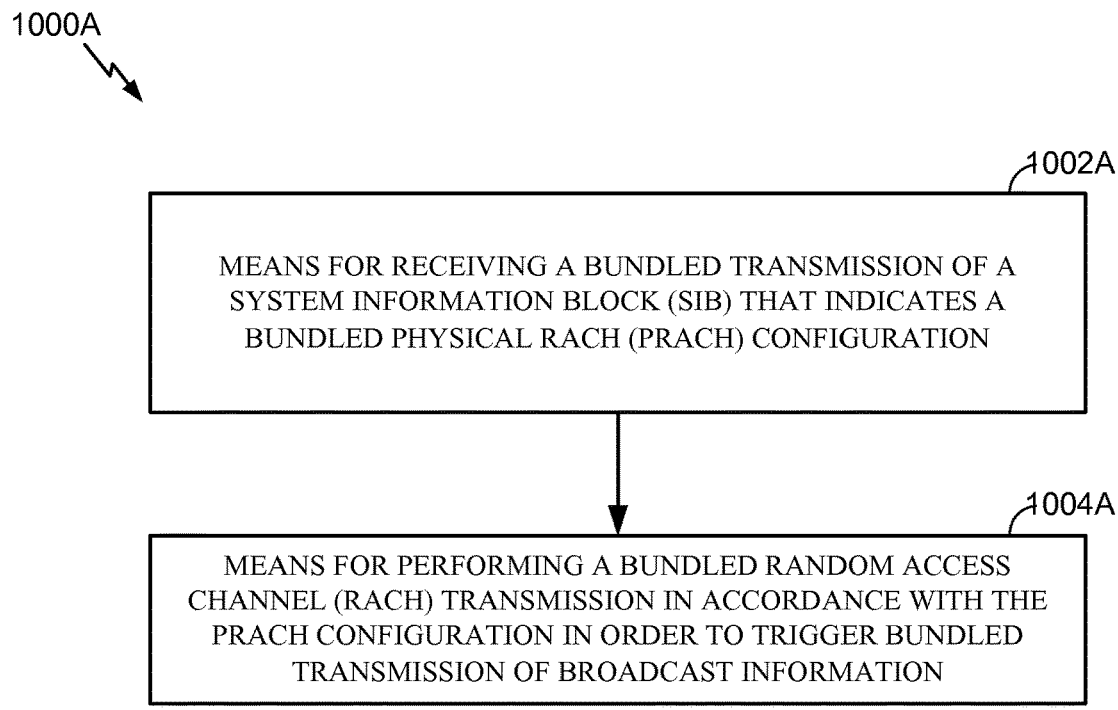
FIG. 10A illustrates example means capable of performing the operations shown in FIG. 10, in accordance with certain aspects of the present disclosure.

FIG. 10 illustrates example operations 1000 for wireless communications, in accordance with certain aspects of the present disclosure. The operations 1000 may be performed, for example, by a UE (e.g., UE 120). The operations 1000 may begin, at 1002, by receiving a bundled transmission of a SIB that indicates a bundled PRACH configuration.

At 1004, the UE may perform a bundled RACH transmission in accordance with the PRACH configuration in order to trigger bundled transmission of broadcast information (e.g., a SIB, a subset of available SIBs, PBCH, etc., or combinations thereof).

According to certain aspects, the above techniques and apparatus may be applied to machine type communications (MTC). According to certain aspects, the above techniques and apparatus may be applied in LTE unlicensed spectrum (LTE-U). For example, where transmissions are over wide bandwidth, broadcast transmissions (e.g., PBCH or synchronization signals) may be repeated in the frequency domain (e.g., outside of the center 6 resource blocks (RBs)). According to certain aspects, the above techniques and apparatus may be applied in high dimension multiple-input multiple-output (MIMO). For example, where antenna arrays for beamforming gains, may not be applicable for PBCH, instead PBCH may be repeated or boosted for gains. According to certain aspects, the above techniques and apparatus may be applied to minimum away. For example, at 60 GHz, propagation loss may be large and thus link budget enhancement may be desired. PBCH may be repeated or boosted as described above to achieve the link budget enhancements.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the corresponding functions. The means may include various hardware or software component(s) or module(s), including, but not limited to a circuit, an application specific integrated circuit (ASIC), or processor. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise. Generally, where there are operations illustrated in figures, those operations may have corresponding counterpart means-plus-function components with similar numbering. For example, operations 502-1002 illustrated in FIGS. 5-10, respectively, correspond to means 502A-1002A illustrated in FIGS. 5A-10A, respectively.

For example, depending on the configuration, means for transmitting may comprise a transmitter or antenna(s) 252 of the UE 120, or a transmitter or antenna(s) 234 of eNB 110. Means for receiving may comprise a receiver or antenna(s) 252 of the UE 120, or a receiver or antenna(s) 234 of eNB 110. Means for determining may comprise a processing system, which may include one or more controllers/processors, such as any of the controllers/processors of the UE 120 and the eNB 110 illustrated in FIG. 2.

According to certain aspects, such means may be implemented by processing systems configured to perform the corresponding functions by implementing various algorithms (e.g., in hardware or by executing software instructions). For example, algorithms include an algorithm for obtaining a first set of one or more power allocation parameters for use in transmitting a PDSCH and an algorithm for transmitting a different type downlink transmission, with transmit power boosted relative to a PDSCH transmission sent using the first set of power allocation parameters, based on a second set of one or more power allocation parameters. In aspects, algorithms include an algorithm for receiving a PDSCH transmission, an algorithm for receiving a different type downlink transmission, with transmit power boosted relative to the PDSCH transmission, an algorithm for receiving information regarding relative transmit power of the PDSCH transmission relative to a common reference signal (CRS) based on the transmit power of the different type downlink transmission, and algorithm for processing the PDSCH transmission based on the information. In aspects, algorithms include an algorithm for transmitting a PBCH in at least one subframe of a radio frame and an algorithm for repeating transmission of the PBCH in at least one of: the same subframe or in a different subframe of the radio frame. In aspects, algorithms include an algorithm for receiving rate matching information for a repeated PBCH transmission in a radio frame and an algorithm for processing downlink transmissions in the radio frame, based on the rate matching information. In aspects, algorithms include an algorithm for receiving a bundled RACH transmission from a UE and an algorithm for triggering bundled transmission of broadcast information, in response to receiving the bundled RACH transmission. In aspects, algorithms include an algorithm for receiving a bundled transmission of a SIB that indicates a bundled PRACH configuration and an algorithm for performing a bundled RACH transmission in accordance with the PRACH configuration in order to trigger bundled transmission of broadcast information.

The various algorithms may implemented by a computer-readable medium, e.g., a non-transitory computer-readable medium. The computer-readable medium may have computer executable instructions (e.g., code) stored thereon. For example, the instructions may be executed by a processor or processing system, such as any of the processors of the UE 120 or eNB 110 illustrated in FIG. 2, and stored in a memory, such as memory 282 of the UE 120 or memory 242 of eNB 110. For example, the computer-readable medium may have computer executable instructions stored thereon for obtaining a first set of one or more power allocation parameters for use in transmitting a PDSCH and instructions for transmitting a different type downlink transmission, with transmit power boosted relative to a PDSCH transmission sent using the first set of power allocation parameters, based on a second set of one or more power allocation parameters. In aspects, the computer-readable medium may have computer executable instructions stored thereon for receiving a PDSCH transmission, instructions for receiving a different type downlink transmission, with transmit power boosted relative to the PDSCH transmission, instructions for receiving information regarding relative transmit power of the PDSCH transmission relative to a common reference signal (CRS) based on the transmit power of the different type downlink transmission, and instructions for processing the PDSCH transmission based on the information. In aspects, the computer-readable medium may have computer executable instructions stored thereon for transmitting a PBCH in at least one subframe of a radio frame and instructions for repeating transmission of the PBCH in at least one of: the same subframe or in a different subframe of the radio frame. In aspects, the computer-readable medium may have computer executable instructions stored thereon for receiving rate matching information for a repeated PBCH transmission in a radio frame and instructions for processing downlink transmissions in the radio frame, based on the rate matching information. In aspects, the computer-readable medium may have computer executable instructions stored thereon for receiving a bundled RACH transmission from a UE and instructions for triggering bundled transmission of broadcast information, in response to receiving the bundled RACH transmission. In aspects, the computer-readable medium may have computer executable instructions stored thereon for receiving a bundled transmission of a SIB that indicates a bundled PRACH configuration and instructions for performing a bundled RACH transmission in accordance with the PRACH configuration in order to trigger bundled transmission of broadcast information The term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members and duplicate members. As an example, "at least one of: a, b, or c" is intended to cover, for example: a, b, c, a-b, a-c, b-c, a-b-c, aa, a-bb, a-b-cc, and etc.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal Generally, where there are operations illustrated in Figures, those operations have corresponding counterpart means-plus-function components with similar numbering.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a base station (BS), comprising:
   transmitting a bundled simplified system information block (SIB), to a user equipment (UE), that indicates a bundled physical random access channel (PRACH) configuration;
   receiving, in accordance with the bundled PRACH configuration, a bundled RACH transmission from the UE indicating a request for bundled broadcast information; and
   triggering a transmission of bundled broadcast information in response to the request indicated by the bundled RACH transmission.

2. The method of claim 1, wherein the transmission of the bundled broadcast information comprises transmission of bundled SIB2 and above in response to the request indicated by the bundled RACH transmission.

3. The method of claim 2, wherein the transmission of the bundled broadcast information further comprises transmission of a bundled physical broadcast channel (PBCH) in response to the request indicated by the bundled RACH transmission.

4. The method of claim 2, wherein the transmission of the bundled broadcast information further comprises transmission of a bundled SIB1 in response to the request indicated by the bundled RACH transmission.

5. The method of claim 1, wherein triggering the transmission of the bundled broadcast information, in response to the request indicated by the bundled RACH transmission, comprises:
   opportunistically triggering the transmission of the bundled broadcast information based on the receiving of the bundled RACH transmission.

6. An apparatus for wireless communications, comprising:
   at least one processor; and
   memory coupled with the at least one processor, the memory comprising code executable by the at least one processor to cause the apparatus to:
   transmit a bundled simplified system information block (SIB), to a user equipment (UE), that indicates a bundled physical random access channel (PRACH) configuration;
   receive, in accordance with the bundled PRACH configuration, a bundled RACH transmission from the UE indicating a request for bundled broadcast information; and
   trigger a transmission of bundled broadcast information in response to the request indicated by the bundled RACH transmission.

7. The apparatus of claim 6, wherein the transmission of the bundled broadcast information comprises transmission of bundled SIB2 and above in response to the request indicated by the bundled RACH transmission.

8. The apparatus of claim 7, wherein the transmission of the bundled broadcast information further comprises transmission of a bundled physical broadcast channel (PBCH) in response to the request indicated by the bundled RACH transmission.

9. The apparatus of claim 7, wherein the transmission of the bundled broadcast information further comprises transmission of a bundled SIB1 in response to the request indicated by the bundled RACH transmission.

10. The apparatus of claim 6, wherein the code executable by the at least one processor to cause the apparatus to trigger the transmission of the bundled broadcast information, in response to the request indicated by the bundled RACH transmission, comprises:
    code executable by the at least one processor to cause the apparatus to opportunistically trigger the transmission of the bundled broadcast information based on the receiving of the bundled RACH transmission.

11. A method for wireless communications by a user equipment (UE), comprising:
    receiving a bundled simplified system information block (SIB) or a SIB1 transmission that indicates a bundled physical random access channel (PRACH) configuration;
    performing a bundled RACH transmission in accordance with the bundled PRACH configuration, the bundled RACH transmission indicating a request for bundled broadcast information; and
    receiving a transmission of bundled broadcast information in response to the request for bundled broadcast information indicated by the bundled RACH transmission.

12. The method of claim 11, wherein the transmission of the bundled broadcast information comprises transmission of bundled SIB2 and above in response to the request indicated by the bundled RACH transmission.

13. The method of claim 12, wherein the transmission of the bundled broadcast information further comprises transmission of a bundled physical broadcast channel (PBCH) in response to the request indicated by the bundled RACH transmission.

14. The method of claim 11, wherein indicating the request for the bundled broadcast information, comprises:
    opportunistically triggering the transmission of the bundled broadcast information based on the receiving of the bundled RACH transmission.

15. An apparatus for wireless communications by a user equipment (UE), comprising:
    at least one processor; and
    memory coupled with the at least one processor, the memory comprising code executable by the at least one processor to cause the apparatus to:
    receive a bundled simplified system information block (SIB) transmission that indicates a bundled physical random access channel (PRACH) configuration;
    perform a bundled RACH transmission in accordance with the bundled PRACH configuration, the bundled RACH transmission indicating a request for bundled broadcast information; and
    receive a transmission of bundled broadcast information in response to the request for bundled broadcast information indicated by the bundled RACH transmission.

16. The apparatus of claim 15, wherein the transmission of the bundled broadcast information comprises transmission of bundled SIB2 and above in response to the request indicated by the bundled RACH transmission.

17. The apparatus of claim 16, wherein the transmission of the bundled broadcast information further comprises transmission of a bundled physical broadcast channel (PBCH) in response to the request indicated by the bundled RACH transmission.

18. The apparatus of claim 15, wherein the code executable by the at least one processor to cause the apparatus to indicate the request for the bundled broadcast information comprises:

code executable by the at least one processor to cause the apparatus to opportunistically trigger the transmission of the bundled broadcast information based on the receiving of the bundled RACH transmission.

19. An apparatus for wireless communications, comprising:

means for transmitting a bundled simplified system information block (SIB) transmission, to a user equipment (UE), that indicates a bundled physical random access channel (PRACH) configuration;

means for receiving, in accordance with the bundled PRACH configuration, a bundled RACH transmission from the UE indicating a request for bundled broadcast information; and means for triggering a transmission of bundled broadcast information in response to the request indicated by the bundled RACH transmission.

20. A non-transitory computer readable medium storing computer executable code thereon for wireless communications, comprising:

code for transmitting a bundled simplified system information block (SIB) transmission, to a user equipment (UE), that indicates a bundled physical random access channel (PRACH) configuration;

code for receiving, in accordance with the bundled PRACH configuration, a bundled RACH transmission from the UE indicating a request for bundled broadcast information; and code for triggering a transmission of bundled broadcast information in response to the request indicated by the bundled RACH transmission.

21. An apparatus for wireless communications, comprising:

means for receiving a bundled simplified system information block (SIB) transmission that indicates a bundled physical random access channel (PRACH) configuration;

means for performing a bundled RACH transmission in accordance with the bundled PRACH configuration, the bundled RACH transmission indicating a request for bundled broadcast information; and means for receiving a transmission of bundled broadcast information in response to the request for bundled broadcast information indicated by the bundled RACH transmission.

22. A non-transitory computer readable medium storing computer executable code thereon for wireless communications, comprising:

code for receiving a simplified system information block (SIB) transmission that indicates a bundled physical random access channel (PRACH) configuration;

code for performing a bundled RACH transmission in accordance with the bundled PRACH configuration, the bundled RACH transmission indicating a request for bundled broadcast information; and code for receiving a transmission of bundled broadcast information in response to the request for bundled broadcast information indicated by the bundled RACH transmission.

* * * * *